UNITED STATES PATENT OFFICE.

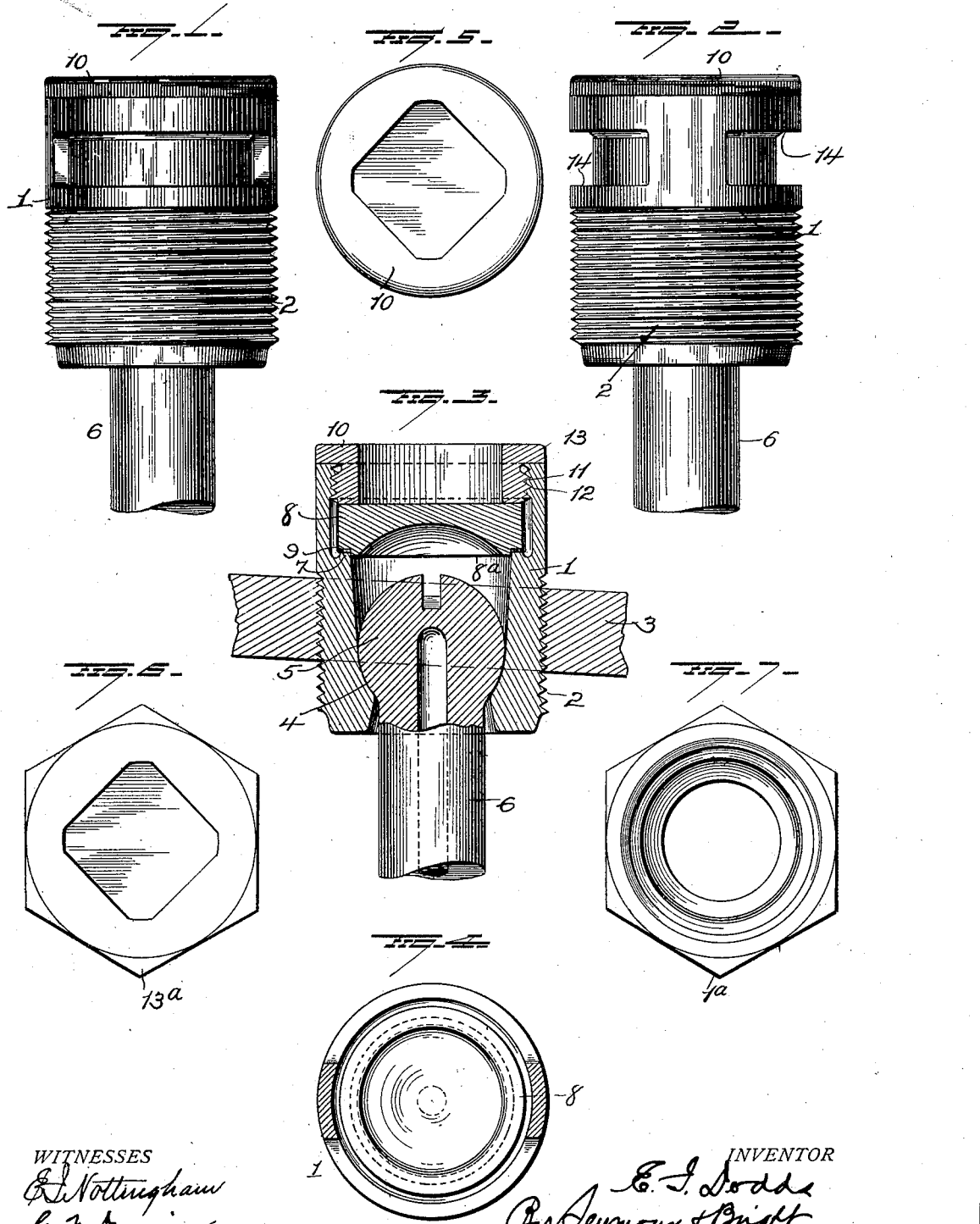

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,313,623.  Specification of Letters Patent.  Patented Aug. 19, 1919.

Application filed April 26, 1918. Serial No. 230,894.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures, and I do hereby declare the following to be a full, clear, and exact description of the invention, such as will enable others skilled in the art to which it appertains to make and use the same.

This invention relates to improvements in staybolt structures for boilers,—one object of the invention being to so construct the mounting of the headed end of a flexible staybolt, that the member thereof which covers the head of the staybolt may be quickly removed without dismembering the balancing of the structure,—thus permitting ready access to the bolt for testing the same.

A further object is to provide a quickly removable and replaceable cap member for staybolt structures.

With these and other objects in view, the invention consists in certain novel features of construction and combinations of parts as hereinafter set forth and pointed out in the claim.

In the accompanying drawings; Figure 1 is a view in elevation showing an embodiment of my invention; Fig. 2 is a similar view taken at right angles to Fig. 1; Fig. 3 is a vertical transverse sectional view; Fig. 4 is a horizontal transverse sectional view; Fig. 5 is a plan view, and Figs. 6 and 7 are views showing modifications.

1 represents a bearing sleeve threaded exteriorly, as at 2, to screw through a boiler sheet 3. The sleeve is made interiorly near its inner end with a curved seat or bearing 4 for the spherical or rounded head 5 of a staybolt 6, and the outer portion of the bore of said sleeve is enlarged, forming an annular shoulder 7 disposed a comparatively short distance beyond that portion of the bore of the sleeve in which the head of the bolt has its bearing.

The annular shoulder 7 constitutes a seat for a cap or cover plate 8, between which latter and the seat, a washer 9 may be interposed. The cover plate may be recessed in its under face and provided with a portion 8ª to enter the bore of the sleeve and serve to properly center said plate. The cap or cover plate closes the chamber of the sleeve in which the head of the bolt is mounted and is located a sufficient distance from said head to permit longitudinal displacement of the bolt.

The cap or cover plate 8 is held tightly in place on its seat by an annular cap member 10 having a threaded portion 11 to enter the outer end of the sleeve 1, the latter being interiorly threaded, as at 12, to receive the threaded portion 11 of the cap member which bears firmly on said cap or cover plate.

The annular cap member may be made with a knurled flange 13 which overhangs the outer end of the sleeve 1, whereby ready manipulation of said cap member may be facilitated, or said cap member may be made with an angular exterior configuration to receive a wrench as shown at 13ª in Fig. 6. This sleeve 1 may also be made with an angular portion 1ª as shown in Fig. 7.

The bearing sleeve 1 is provided in its wall with diametrically opposite slots 14—14, each of sufficient size to permit the passage of the cap or cover plate 8, so that when the cap member 10 is loosened, said plate may be removed.

It will be observed that normally the cap or cover member will tightly close the bearing sleeve over the head of the bolt, but that by partly turning the annular cap member, said cap or cover plate will be released and may be quickly removed through either of the slots 14. Access to the head of the bolt, through the annular cap member 10 will thus be afforded to permit testing of the bolt to determine its condition. Should the bolt be found to be sound, the cap or cover plate 8 may be quickly replaced and clamped in place by screwing down the annular cap member.

By the term "annular cap member" as used herein, is meant a member which is annular in form and open so that when the cover plate has been removed, the head of the bolt will be exposed to view through said annular cap member.

Having fully described my invention what I claim as new and desire to secure by Letters-Patent, is:—

In a staybolt structure, the combination with a bearing sleeve having a slotted wall, of a cap plate disposed within said bearing sleeve and removable through the slotted wall, and a cap member having an opening therethrough normally closed by the removable cap plate, said cap member serving normally to clamp said cap plate in place within the bearing sleeve.

In testimony whereof I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."